United States Patent
Quan et al.

(10) Patent No.: US 8,798,414 B2
(45) Date of Patent: Aug. 5, 2014

(54) HIGH QUALITY FACTOR PHOTONIC CRYSTAL NANOBEAM CAVITY AND METHOD OF DESIGNING AND MAKING SAME

(75) Inventors: Qimin Quan, Somerville, MA (US); Marko Loncar, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 166 days.

(21) Appl. No.: 13/249,135

(22) Filed: Sep. 29, 2011

(65) Prior Publication Data

US 2012/0099817 A1 Apr. 26, 2012

Related U.S. Application Data

(60) Provisional application No. 61/387,634, filed on Sep. 29, 2010.

(51) Int. Cl.
G02B 6/34 (2006.01)
G02B 6/10 (2006.01)
G02F 1/295 (2006.01)

(52) U.S. Cl.
USPC ............................. 385/37; 385/10; 385/129

(58) Field of Classification Search
USPC ....................... 385/10, 37, 129–132
See application file for complete search history.

(56) References Cited

U.S. PATENT DOCUMENTS

| 6,493,090 | B1 | 12/2002 | Lading et al. | |
| 6,834,144 | B2* | 12/2004 | Belmonte et al. | 385/37 |
| 6,898,358 | B2* | 5/2005 | Li et al. | 385/122 |
| 7,603,016 | B1* | 10/2009 | Soref | 385/129 |
| 7,907,848 | B1* | 3/2011 | Soref | 398/140 |
| 2003/0223720 | A1* | 12/2003 | Li et al. | 385/129 |
| 2003/0231822 | A1* | 12/2003 | Li et al. | 385/24 |
| 2005/0078912 | A1* | 4/2005 | Iazikov et al. | 385/37 |
| 2005/0152656 | A1* | 7/2005 | Talneau et al. | 385/129 |
| 2005/0281298 | A1 | 12/2005 | Kupershmidt | |
| 2006/0215976 | A1* | 9/2006 | Singh et al. | 385/126 |
| 2007/0076201 | A1 | 4/2007 | Babin | |
| 2008/0212068 | A1 | 9/2008 | Sailor et al. | |
| 2009/0136181 | A1 | 5/2009 | Vollmer | |
| 2010/0014821 | A1* | 1/2010 | Tokushima | 385/129 |
| 2011/0069727 | A1* | 3/2011 | Reid et al. | 372/20 |
| 2012/0099817 | A1* | 4/2012 | Quan et al. | 385/33 |

OTHER PUBLICATIONS

Bong-Shik Song, Susumu Noda, Takashi Asano & Yoshihiro Akahane, "Ultra-high-Q photonic double-heterostructure nanocavity," Nature Materials 4, 207-210 (2005).

Foresi et. al., "Photonic bandgap micro-cavity in optical waveguides," Nature 390, p. 143 (1997).

Y. Akahane, T. Asano, B. S. Song, & S. Noda, "High-Q photonic nanocavity in a two-dimensional photonic crystal" Nature 425, 944-947 (2003).

(Continued)

*Primary Examiner* — Rhonda Peace
(74) *Attorney, Agent, or Firm* — 24IP Law Group; Timothy R DeWitt (57) ABSTRACT

A deterministic design and manufacturing of an ultrahigh Q-factor, wavelength-scale optical cavity is invented and experimentally demonstrated. The design can be implemented on photonic crystal nanobeam cavities, which are based on 1D optical waveguides. The waveguide has dielectric index alternations that provide constructive interference and produces optical resonance.

20 Claims, 8 Drawing Sheets

(56) References Cited

OTHER PUBLICATIONS

S. Tomljenovic-Hanic, C. M. de Sterke, & M. J. Steel, "Design of high-Q cavities in photonic crystal slab heterostructures by air-holes infiltration," Optics Express 14, 12451-12456 (2006).

E. Kuramochi et. al., "Ultrahigh-Q photonic crystal nanocavities realized by the local width modulation of a line defect,"Appl. Phys. Lett. 88, 041112 (2006).

M. Notomi, E. Kuramochi, and H. Taniyama, "Ultrahigh-Q Nanocavity with 1D Photonic Gap,"Optics Express, 16, 11095 (2008).

J. M. Geremia, J. Williams & H. Mabuchi, "Inverse-problem approach to designing photonic crystals for cavity QED experiments,"Phys. Rev. E 66, 066606(2002).

D. Englund, I. Fushman & J. Vuckovic, "General recipe for designing photonic crystal cavities,"Optics Express 13, 5961-5975 (2005).

Q. Quan, P. B. Deotare, and M. Loncar, "Photonic Crystal Nanobeam Cavity Strongly Coupled to the Feeding Waveguide," Appl. Phys. Lett 96, 203102 (2010).

Kim, et al., "Low-loss surface-plasmonic nanobeam cavities," May 24, 2010 / vol. 18, No. 11 / Optics Express 11089.

\* cited by examiner

HIGH QUALITY FACTOR PHOTONIC CRYSTAL NANOBEAM CAVITY AND METHOD OF DESIGNING AND MAKING SAME

CROSS-REFERENCE TO RELATED APPLICATIONS

The present application claims the benefit of the filing date of U.S. Provisional Patent Application Ser. No. 61/387,634 filed by the present inventors on Sep. 29, 2010.

The aforementioned provisional patent application is hereby incorporated by reference in its entirety.

STATEMENT REGARDING FEDERALLY SPONSORED RESEARCH OR DEVELOPMENT

This invention was made with government support under ECCS-0846684 awarded by National Science Foundation. The government has certain rights in the invention.

BACKGROUND OF THE INVENTION

1. Field of the Invention

The present invention relates to photonic crystal (PhC) cavities and more particularly to a novel method for deterministically designing and making a high quality factor, wavelength scale photonic crystal nanobeam cavity. The deterministic method of the present invention can be applied to different material systems and to cavities resonant at different ranges of wavelengths as well.

2. Brief Description of the Related Art

Photonic crystal (PhC) cavities with high quality (Q) factors and wavelength-scale mode volumes are widely applied in fields that range from quantum information processing and nonlinear optics to biomedical sensing. PhC nanobeam cavities (shown in FIG. 1) are based on a strip waveguide 110, with grating sections (dielectric alternations) along the waveguide. These grating sections provide constructive optical interference and confine light. One form of the grating is etched holes 120 along the waveguide, but many different types of gratings can be used.

PhC nanobeam cavities have small footprints and are naturally integrated with optical waveguides. Hence, they are ideal candidates for the realization of densely integrated photonic systems and are suitable for applications ranging from optical interconnects to biochemical sensors.

Figure 1:
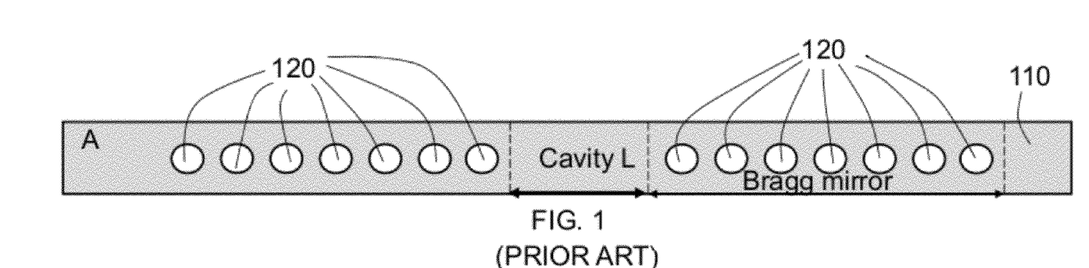
FIG. 1 is a schematic of a conventional Bragg mirror and a cavity region with length L.

A nanobeam cavity made of silicon is demonstrated in Foresi et. al., "Photonic bandgap micro-cavity in optical waveguides," Nature 390, p. 143 (1997). The quality factor, however, was only around 250. The major loss came from scattering due to imperfect design of the grating sections 120.

The design of PhC cavities is typically based on extensive parameter search and optimization, also known as intuitive design. See for example, Y. Akahane, T. Asano, B. S. Song, & S. Noda, Nature 425, 944-947 (2003); B. S. Song, S. Noda, T. Asano, & Y. Akahane, Nature Materials 4, 207-210(2005); S. Tomljenovic-Hanic, C. M. de Sterke, & M. J. Steel, Optics Express 14, 12451-12456 (2006); E. Kuramochi et. al., Appl. Phys. Lett. 88, 041112 (2006); M. Notomi, E. Kuramochi, and H. Taniyama, Optics Express, 16, 11095(2008). The large computational cost, in particular the computation time, needed to perform the simulation of high Q cavities makes such a trial-based method inefficient.

Other methods have been proposed as well. Inverse engineering design, in which the physical structure is optimized by constructing specific target functions and constraints, was proposed in J. M. Geremia, J. Williams & H. Mabuchi, Phys. Rev. E 66, 066606(2002). A design recipe based on the desired field distribution is proposed in D. Englund, I. Fushman & J. Vuckovic, Optics Express 13, 5961-5975 (2005).

SUMMARY OF THE INVENTION

The present invention is a deterministic method to design and manufacture an ultrahigh Q, sub-wavelength scale mode volume, PhC nanobeam cavity. The invention therefore significantly reduces the modeling and computation time required for the design of the cavities.

In a preferred embodiment, the present invention further is a novel method that can deterministically design and manufacture a high quality factor, wavelength scale photonic crystal nanobeam cavity that is resonant at a targeted frequency. This is important for number of applications ranging from optical filters and spectrometers, to modulators, sensors, amplifiers, and so on.

In a preferred embodiment, the present invention is a method for deterministically making a nanobeam cavity without fine tuning, resizing and rescaling of the structure of the nanobeam cavity. The nanobeam cavity is based on optical strip waveguides along which dielectric index alternations provide constructive interference and produce optical resonance. The nanobeam cavity has a plurality of grating sections. The method comprises the steps of selecting a period for the nanobeam cavity, wherein the selected period opens a band gap, forming the nanobeam cavity to have a width selected to push a fundamental mode of the nanobeam cavity away from a light line, selecting a periodicity for the nanobeam cavity that will yield a dielectric band edge, etching a first hole in a first grating section of the nanobeam cavity using a first filling fraction, etching a second hole in a second grating section of the nanobeam cavity using a second filling fraction, the second filling fraction being different than the first filling fraction, and etching a third hole in a third grating section of the nanobeam cavity using a third filling fraction, the third filling fraction being different than the first and the second filling fractions. Differences in sizes of the first, second and third holes create linearly increasing mirror strengths for the first, second and third grating sections. To linearly increase mirror strengths of the first, second and third grating sections, the width and/or thickness of the nanobeam cavity also may be tapered.

In another preferred embodiment, the present invention is an optical device. The device comprises a strip waveguide having a width selected to push a fundamental mode of the strip waveguide away from a light line. The strip waveguide comprises a central cavity of length L and a plurality of grating sections formed by a plurality of holes in the strip waveguide on each side of the central cavity. A distance between centers of each pair of adjacent holes on each side of the center of the strip waveguide is constant, the distance being selected to open a band gap. Each grating section has a filling fraction and on one side of the central cavity at least two grating sections have different selected filling fractions, and a filling fraction of a hole adjacent the central cavity is selected to yield a dielectric band edge. The length L may be zero or greater than zero. The strip waveguide may comprise one selected from the group of: a ridge waveguide, a groove waveguide, a curved waveguide, a tapered waveguide, an optical fiber, and a slot waveguide. The strip waveguide may further comprise pins extending from a central region along a length of the strip waveguide. The strip waveguide may be formed from one of the following: silicon, silicon on insulator, silicon on sapphire, silica, silicon nitrate, diamond, doped glass, high-index glass, quartz, polymer, polydimethylsiloxane, InP, InGaAsP, GaP, AlGaAs and other III-V compounds, SiGe, SiC, different glasses, and ceramics. The strip waveguide may further comprise active materials, for example, quantum dots, defect color centers and dyes. In other embodiments, the optical device may comprise a plurality of strip waveguides formatted in arrays or in a matrix. A resonance frequency of the optical device is in one of the following: the visible range, the near-infra-red range, the mid-infrared range, the UV range, the GHz range and the THz range. The resonance frequency of each strip waveguide can be reconfigured mechanically, by heating, by carrier injection or by nonlinear optical processes.

The optical device may further comprise means for exciting the strip waveguide, such as an optical fiber, a tapered optical fiber, a focused optical beam and an unfocused optical beam. The optical device further may comprise means for collecting a signal from the strip waveguide such as an optical fiber, a tapered optical fiber, and a lens.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The design approach of the present invention is deterministic in the sense that it does not involve any trial-based manipulation of the cavity geometry, including hole shifting, re-sizing and overall cavity re-scaling. The present approach results in ultra-high Q cavity by-design. Moreover, the final cavity has resonance that is typically less than 1% away from a desired operation frequency. Therefore, the method of the present invention allows for fast design of optical cavities with predetermined resonant frequency and by-design ultra-high Q. Further, the design and manufacturing method of the present invention requires only computationally inexpensive, photonic band calculations (e.g. using a plane wave expansion method). Ultra-high Q cavity devices can be manufactured according to the design parameters using electron beam or optical lithography methods.

Figure 2A:
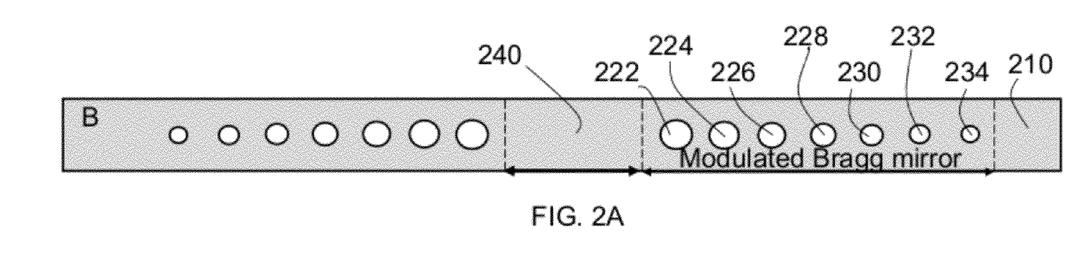
FIG. 2A is a schematic of modulated Bragg mirror cavity and a cavity region with length L.

The design method is based on the realization of a Gaussian-like field profile proposed in Q. Quan, P. B. Deotare, and M. Loncar, "Photonic Crystal Nanobeam Cavity Strongly Coupled to the Feeding Waveguide," Appl. Phys. Lett 96, 203102 (2010) and further strengthened in Q. Quan and M. Loncar, "Deterministic design of wavelength scale, ultra-high Q photonic crystal nanobeam cavities," Opt. Express 19, 18529 (2011). A structure that provides this preferred Gaussian field distribution can be obtained by tapering a conventional Bragg mirror by satisfying the following criteria. The periodicity of the Bragg mirror is maintained—that is, grating sections of the new (here disclosed) mirror have constant periodicity. For example, if gratings are formed by etching holes 222, 224, 226, etc. along a waveguide 210, then the hole to hole distances, i.e., the distance from the central axis of one hole to the central axis of an adjacent hole, are constant throughout the waveguide 210 (FIG. 2A). Field distribution inside a conventional Bragg mirror (FIG. 1) goes as $\exp(-\kappa x)$ where $\kappa$ terms as mirror strength. The cavity design of the present invention, such as is shown in FIG. 2A, has a Gaussian field distribution $\exp(-\sigma x^2)$, which can be achieved by making the mirror strength of the conventional Bragg mirror dependent on the position within the grating as $\kappa = \sigma x$. That is, the strength of the grating sections increases as a function of the distance the hole is away from the center of the cavity 240. Such a mirror of the present invention may be referred to as a "Gaussian mirror".

Figure 2B:
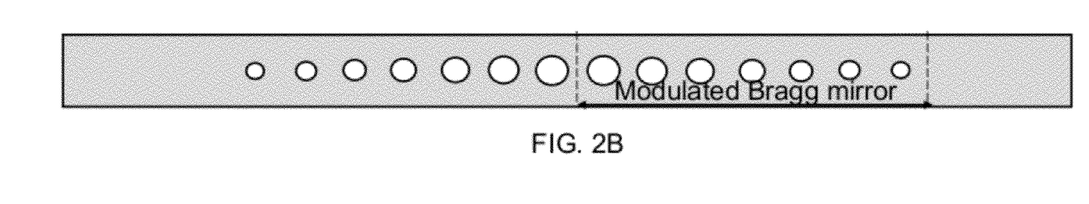
FIG. 2B is a schematic of modulated Bragg mirror or "Gaussian mirror" cavity and zero cavity length. This is the proposed architecture of a dielectric mode cavity that supports a Gaussian field distribution.

As an example, assume that the gratings are formed by etching holes 222, 224 226, etc. along the waveguide 210. Then, one way to realize the "Gaussian mirror" is to quadratically decrease the filling fraction (FF) of each grating section. The filling fraction is defined as the ratio of the hole area to the area of one section of the grating. FIG. 2D shows a dispersion relation of two different grating sections with FF=0.2 and FF=0.1. Decreasing the filling fraction FF shifts the dispersion curve to lower frequencies and thus pulls the central dielectric band edge (circle 260 in FIG. 2D) into the middle of the bandgap. The Gaussian mirror can be defined by varying hole sizes in many other different ways (changing hole shapes, vertical profile, etc).

With the present invention, the highest Q and the smallest mode volume is achieved in a so-called "zero-length cavity" mirror. In other words, when there is no additional cavity region in between the "modulated Bragg mirrors", i.e., cavity length L is zero (FIG. 2B). The present approach, however, is valid for cavity geometries with non-zero cavity length as well. In accomplishment of the above criteria, a cavity (FIG. 2B) that stores its energy in the center (dielectric region) of the cavity is achieved. These cavities are termed as dielectric-mode cavities.

In many applications such as cavity optical trapping, cold atom experiment, polymer nonlinear optics, a cavity that stores its energy in the air region is required or preferred. These cavities are often termed as air-mode cavities.

Figure 2C:
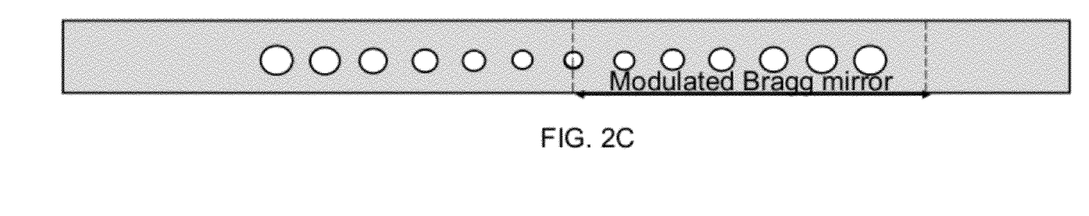
FIG. 2C is a schematic of Gaussian mirror cavity and zero cavity length. This is the proposed architecture of an air-mode cavity that supports a Gaussian field distribution.
Figure 2D:
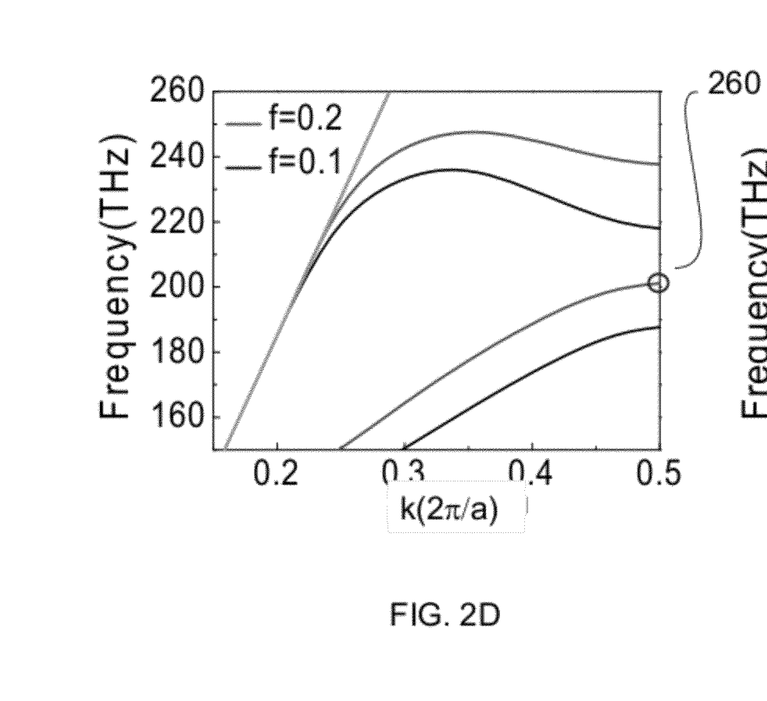
FIG. 2D is a dispersion curve of grating sections with different filling fractions or filling fractions (FFs) showing how a dielectric-mode cavity is formed.
Figure 2E:
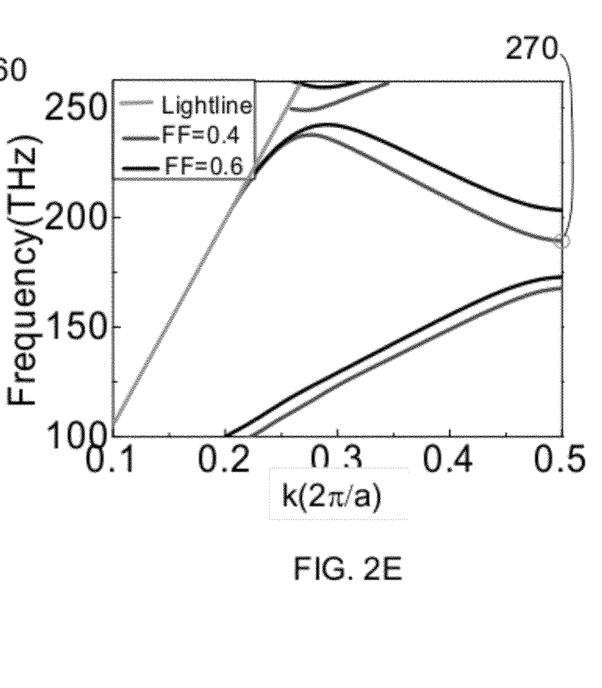
FIG. 2E is a dispersion curve of grating sections with different filling fractions (FFs) showing how an air-mode cavity is formed.

An air-mode cavity can be achieved with a slight modification to the above criteria (FIG. 2C). Specifically, consider the case the grating formed by etching holes along the waveguide. In contrast to the dielectric cavity case, the FFs should be increased in order to get an increasing grating strength. This is because the air-mode cavity is formed from the air-band mode. Increasing the FF will shift the dispersion curve to higher frequencies which results in the air-band edge mode of the central section being positioned at the center of the bandgap (270 in FIG. 2E). Same as in the dielectric-mode cavity case, the optimal cavity length (resulting in highest Q/V) for air-mode cavity is zero (FIG. 2C).

Figure 2F:
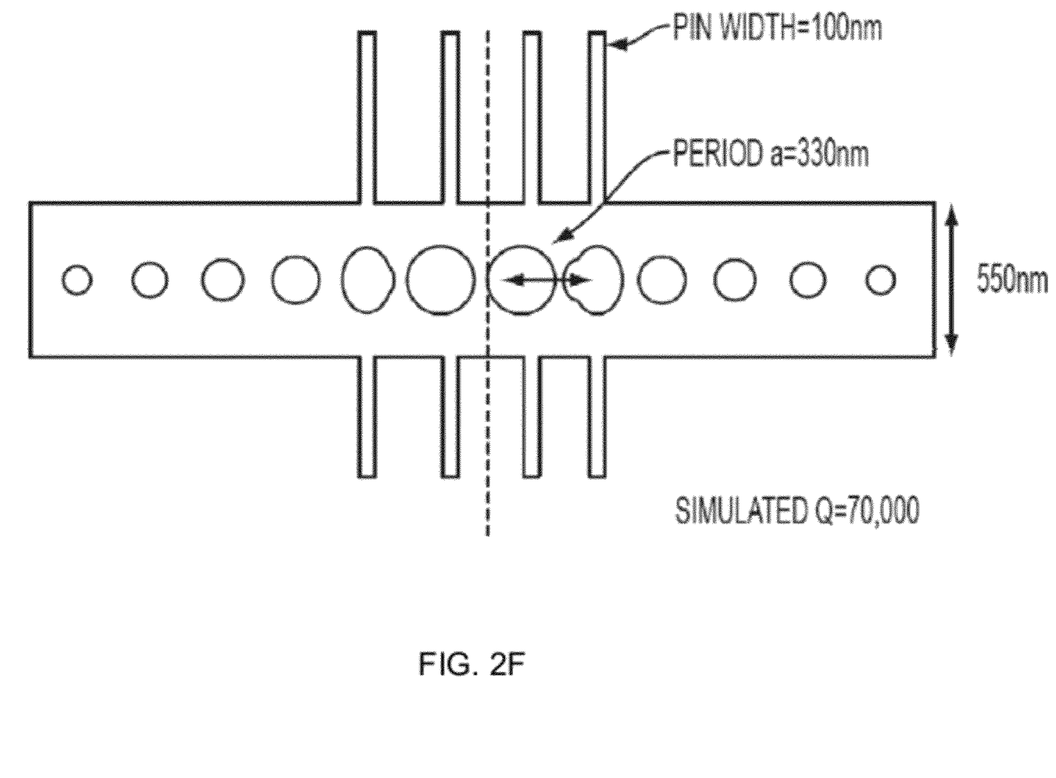
FIG. 2F is a proposed architecture of a dielectric-mode cavity (such as in FIG. 2B) with additional 4 pin structures in the center of the cavity. This structure can be used as an optimal design of optical modulators.

A slight modification made on the above designed dielectric-mode cavity will give an optimal design for an on-chip modulator. A modulator modulates an optical signal that is coming through the nanobeam cavity by the injection of carriers. The pins (shown in FIG. 2F) provide the pathway of the injected carriers. We have carried out simulations to show that nanobeam cavities (using the above mentioned design) with additional 4 pins (width=100 nm) possess quality factors on the order of $10^4$ to $10^5$, which are sufficient for optical modulators.

In a preferred embodiment, the present invention is a method to design and manufacture a PhC cavity. The material that forms the cavity may be one of the following: silicon, silicon on insulator, silicon on sapphire, silica, silicon nitrate, diamond, doped glass, high-index glass, quartz, polymer, polydimethylsiloxane, InP, InGaAsP, GaP, AlGaAs and other III-V compounds, SiGe, SiC, different glasses, ceramics (including TiO2, etc), and so on. The present invention is not specific to any particular material. The design is also valid for cavities that contain active materials, such as, but not limited to, quantum wells, quantum dots, defect color centers, dyes and etc. for realization of lasers and light emitting sources. Such designed cavities may be formatted in arrays, or in matrix.

The resonance frequency may be in the visible, in the near-infrared, in the mid-infrared, in the UV, Gigahertz, THz, range. The design is not specific to any frequency range since underlying Maxwell equations that govern behavior of electro-magnetic waves do not have any fundamental length scale.

The resonance frequency of each cavity can be reconfigured mechanically, by heating, by carrier injection, or by nonlinear optical processes.

Each micro-cavity may be individually excited or simultaneously excited with other micro-cavities, where the micro-cavities are excited using optical fibers, tapered optical fibers, or through focused or non-focused optical beams. A signal from each micro-cavity may be transferred to optical waveguides, arrays of optical fibers, imaging arrays, or detector arrays.

The present invention is described herein through exemplary design of an ultra-high Q and small mode volume dielectric mode PhC nanobeam cavity that operates at 1.5 μm (200 THz) in a realistic geometry.

Assume that the nanobeam is made with silicon-on-insulator material with 220 nm thick Si device layer (constrained by our SOI wafer properties). Structures (holes, waveguides) are manufactured with electron beam lithography and reactive ion etching, and the beam is suspended in air (both ends bridged on the substrate).

Figure 2G:
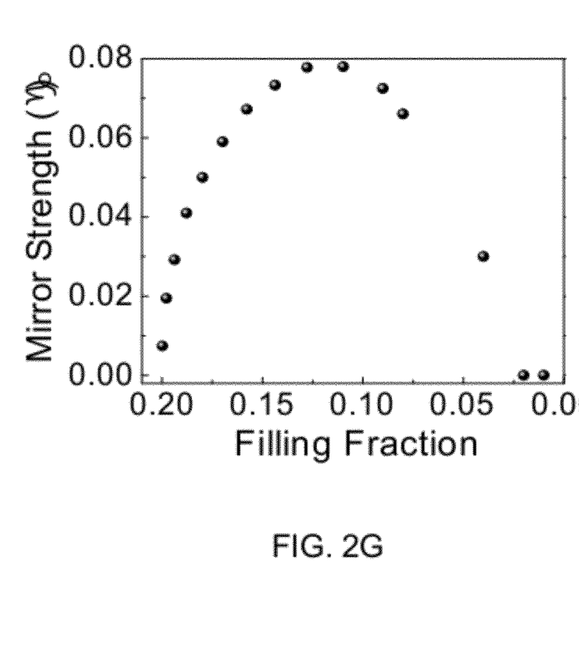
FIG. 2G is a graph of mirror strengths for different filling fractions (FF) in accordance with a preferred embodiment of the present invention.

The design approach is as follows:
(i) Determine a target frequency. As an example, consider $f_{target}$=200 THz. Since the cavity resonant frequency is typically 1% smaller than the dielectric band-edge of the central segment, estimated using the perturbation theory, we shift-up the target frequency by 1%, i.e. $f_{adjusted}$=202 THz.
(ii) Pick the thickness of the nanobeam—this is often predetermined by the choice of the wafer. For example, in the example, the thickness of the nanobeam is 220 nm, determined by the thickness of the device layer of our silicon-on-insulator (SOI) wafer.
(iii) Choose periodicity according to $a=\frac{1}{2}n_{eff}$, where $n_{eff}$ is an effective mode index of the cavity and can be estimated by numerical modeling of a strip waveguide that the nanobeam cavity is based on. However, we found that the absolute value of the periodicity is not crucial in the present method, as long as there exists a bandgap. Therefore, for the example, we pick $n_{eff}$=2.23, which is a median value of possible effective indices in the case of free standing silicon nanobeam ($n_{eff} \in (1, 3.46)$). This results in a=330 nm.
(iv) Set the nanobeam width. Larger width increases the effective index of the cavity mode, pulls the mode away from the light line, and thus reduces the in-plane radiation loss. On the other hand, a large beam width will allow for higher order modes with the same symmetry as the fundamental mode of interest. Using band diagram simulations, we found that a width of 700 nm is good trade-off between these two conditions (see FIG. 2D).
(v) Set the filling fraction of the first mirror section such that its dielectric band-edge is at the adjusted frequency: 202 THz in the example case. Band diagram calculations based on unit cells are sufficient for this analysis. We found that an optimal filling fraction in our case is $f_{start}$=0.2 (FIG. 2D).
(vi) Find the filling fraction that produces the maximum mirror strength for the target frequency. This involves calculating the mirror strength for several filling fractions (FIG. 2G), each of which takes one or two minutes on a laptop computer. In the example case we found that $f_{end}$=0.1.
(vii) Pick the number of mirror segments (N) to construct the Gaussian mirror: we found that N≥15 (on each side) are generally good to achieve high radiation-Qs.

Figure 2H:
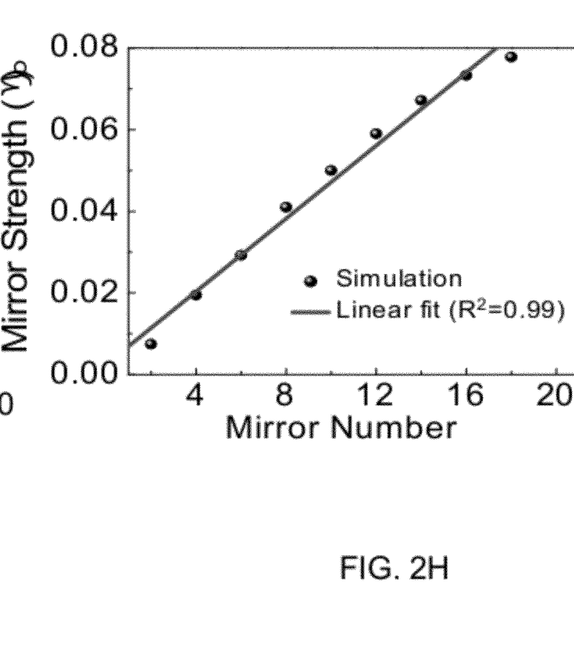
FIG. 2H is a graph of mirror strength at different mirror numbers after quadratic tapering in accordance with a preferred embodiment of the present invention.

(viii) Create the Gaussian mirror by tapering the filling fractions quadratically from $f_{start}$ (=0.2 in our case) to $f_{end}$ (=0.1) over the period of N segments. Through this quadratic scaling, the mirror strengths can be linearized (FIG. 2H).

Figure 2I:
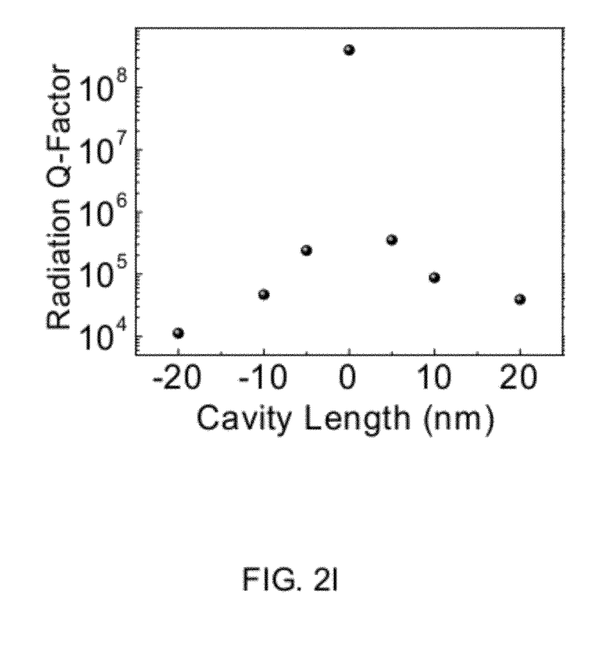
FIG. 2I is a graph of finite-difference time-domain simulation results of cavity in accordance with a preferred embodiment of the present invention with various cavity lengths L.
Figure 2J:
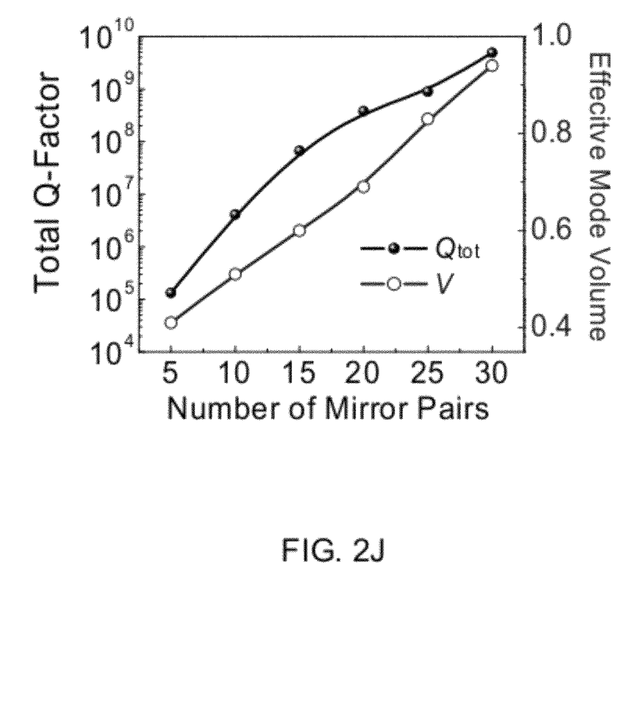
FIG. 2J is a graph of quality factors and mode volumes of the deterministically designed radiation-limited nanobeam cavities with different numbers of mirror pairs (N), obtained from a finite-difference time-domain simulation.
Figure 2K:
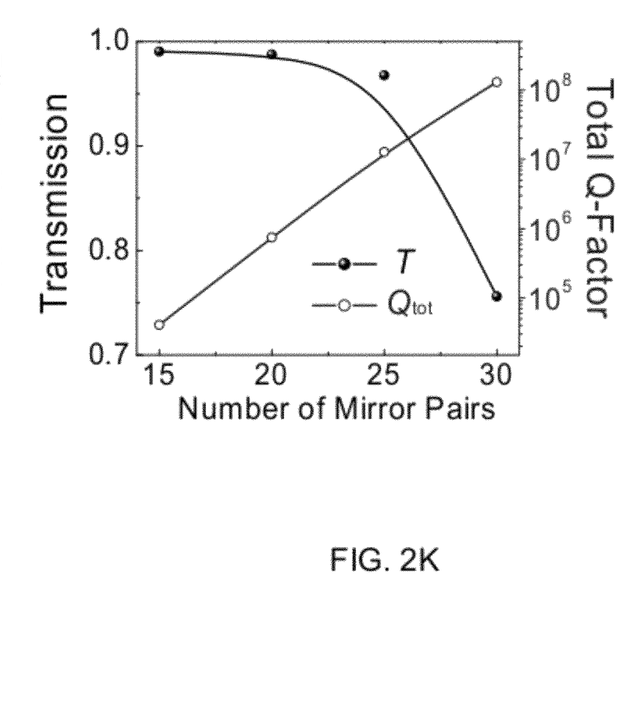
FIG. 2K is a graph of quality factors and on-resonance transmissions of deterministically designed waveguide-coupled nanobeam cavities with different numbers of mirror pairs (N), obtained from a finite-difference time-domain simulation.

(ix). Finally, the cavity is formed by putting two Gaussian mirrors back to back, with no additional cavity length in between (L=0). FIG. 2I proves through finite-difference time-domain simulation that L=0 results in highest Q. To achieve a radiation-limited cavity ($Q_{wg} \gg Q_{rad}$), ten additional mirrors with the maximum mirror strength are placed on both ends of the Gaussian mirror. To achieve a waveguide-coupled cavity ($Q_{wg} \ll Q_{rad}$), no additional mirror pairs are needed. The transmission to the coupled waveguide can be controlled by the number of mirror pair segments (N) in the Gaussian mirror. In the above design method (i)-(ix), all cavity parameters are determined using fast (a few minutes long) band diagram calculations only, and no trial-based parameter-search steps are needed. This significantly reduces the computational cost of the design process by several orders of magnitude. To verify the designs, a 3D finite-difference time-domain simulation was used to study the cavity with the above-mentioned parameters. The results for the radiation-limited cavities are shown in FIG. 2J. An ultra-high Q of $5.0 \times 10^9$ is achieved while maintaining the small mode volume of $0.9 \times (\lambda_{res}/n_{si})3$ at N–30. The results for the waveguide-coupled cavities are shown in FIG. 2K. A record high-T (97%) and high-Q ($1.3 \times 10^7$) cavity is achieved at N=25.

In principle, the Q factors can be made arbitrarily high by applying a sufficiently slow modulation, at the cost of a larger mode volume. However, in practice the cavity Q-factor is limited by material losses and fabrication imperfections, and therefore, a design Q in the range of $10^7$ is sufficient.

To manufacture the above cavities for various applications (sensing, optical communication, quantum optics etc), a waveguide-coupled cavity with N=40 was designed with the above procedure. The devices were fabricated on a silicon-on-insulator_SOI_substrate with a device layer of 220 nm and an insulator layer of 2 um. To define the structures, a negative electron-beam lithography resist was used for electron beam lithography. The structures were etch in a reactive ion etcher. A spot size converter consisting of a $2 \times 2$ um$^2$ cross section polymer pad ($n_{pad}$=1.58) was used to couple light in and out of the cavities using a tapered optical fiber, see for example S. J. McNab, N. Moll, and Y. A. Vlasov, Opt. Express 11, 2927(2003). The devices were covered with another, more robust, polymer with a refractive index $n_{clad}$=1.34. Using 3D finite-difference time-domain modeling it was found that the cavity resonance is shifted to a smaller wavelength (FDTD)=1517 nm, the cavity $Q_{total}$ is 2.72E6, and the on-resonance transmission is T=75%.

The device was characterized by scanning a tunable laser source from 1470 to 1580 nm. A tapered fiber (2.5 um spot diameter) was used to couple light in and out of the polymer waveguide. A polarizer was placed at the output to filter out the TM-like mode.

Figure 3A:
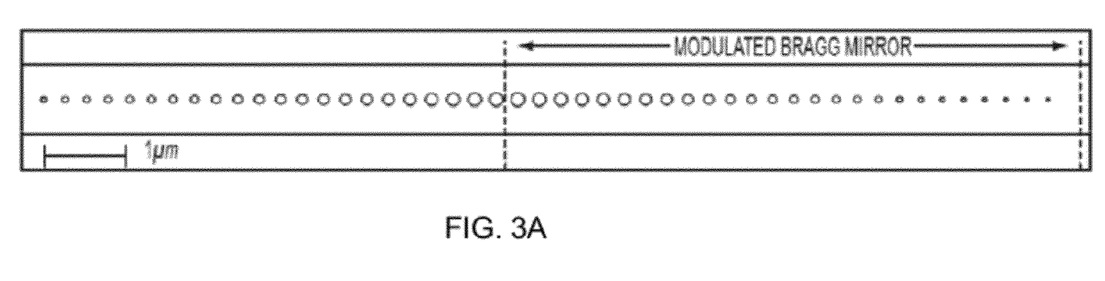
FIG. 3A is a top view of an example nanobeam cavity having a cavity length L equal to 0 in accordance with a preferred embodiment of the present invention.
Figure 3B:
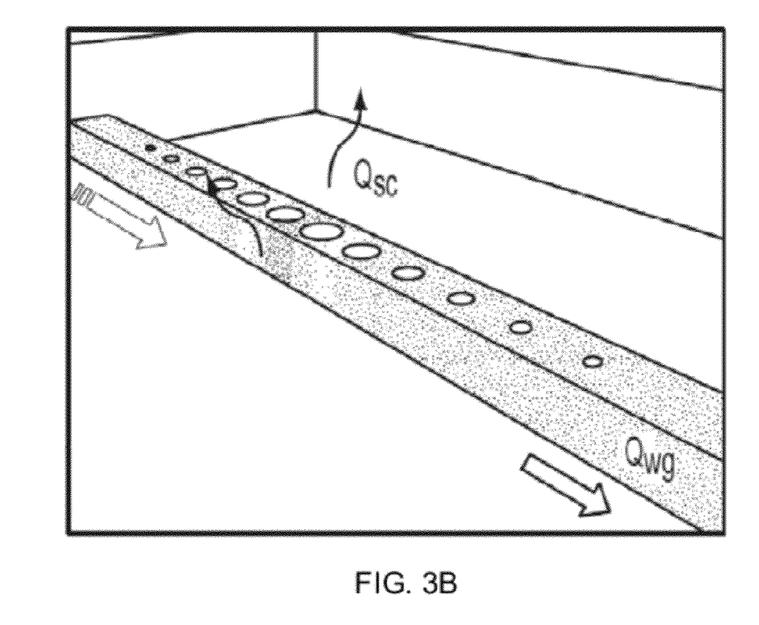
FIG. 3B is a perspective view of an example nanobeam cavity in accordance with a preferred embodiment of the present invention.

FIG. 3A is a top view of an example nanobeam cavity in accordance with a preferred embodiment of the present invention. FIG. 3B is a perspective view of modulated nanobeam cavity in accordance with a preferred embodiment of the present invention.

Figure 3C:
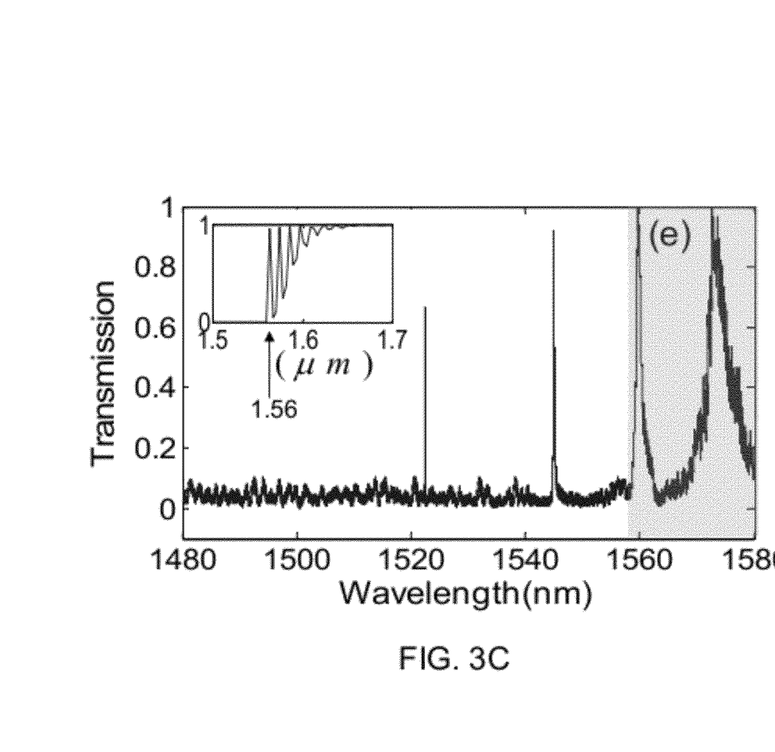
FIG. 3C illustrates an experimental transmission spectrum of typical dielectric-mode cavity (input power 100 uW).

An experimental transmission spectrum of typical dielectric-mode cavity (input power 100 uW) is shown in FIG. 3C. The signal is normalized by the band edge modes (shaded region), which have unity transmission, as verified by 3D finite-difference time-domain simulations shown in the inset. Due to the very large photon life time of the ultrahigh Q cavity of the present invention, it becomes nearly impossible to model transmission through the cavity-resonant-tunneling using the 3D finite-difference time-domain method directly. Hence, the high-Q cavity mode does not appear in the simulated spectrum shown in the inset.

Figure 3D:
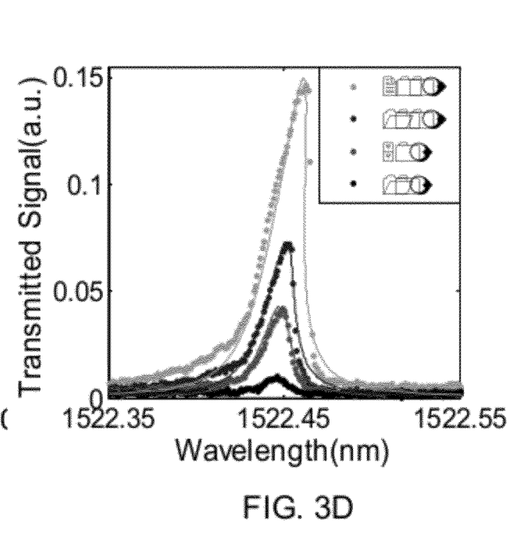
FIG. 3D shows a zoom-in of the transmitted signal of the fundamental mode of a waveguide in accordance with a preferred embodiment of the present invention at different input power levels.

A zoom-in of the transmitted signal of the fundamental mode at different input power levels is shown in FIG. 3D. A nonlinear bistable lineshape is observed, as shown by the power dependent spectra in FIG. 3D. The experimental data was fitted using the nonlinear bistable equation, see M. Soljacic, M. Ibanescu, S. G. Johnson, Y. Fink, and J. D. Joannopoulos, Phys. Rev. E 66, 055601(R) (2002). From the fits, we obtained an experimental Q=80 000 and an on-resonance transmission T=73% for the on-substrate and polymer capped cavity. This corresponds to a $Q_{sc}$=500 000. This is a record high-transmission and high-Q cavity.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for deterministically making a nanobeam cavity without fine tuning, resizing and rescaling of the structure of the nanobeam cavity, wherein said nanobeam cavity is based on optical strip waveguides along which dielectric index alternations provide constructive interference and produce optical resonance and wherein said nanobeam cavity has a plurality of grating sections, comprising the steps of:

selecting a period for said nanobeam cavity, wherein said period is fixed throughout the beam and said selected period opens a band gap;

forming said nanobeam cavity to have a width selected to push a fundamental mode of said nanobeam cavity away from a light line;

etching a first hole in a first grating section of said nanobeam cavity using a first filling fraction;

etching a second hole in a second grating section of said nanobeam cavity using a second filling fraction, said second filling fraction being different than said first filling fraction; and etching a third hole in a third grating section of said nanobeam cavity using a third filling fraction, said third filling fraction being different than said first and said second filling fractions;

wherein differences in sizes of said first, second and third holes create linearly increasing mirror strengths for said first, second and third grating sections.

2. A method for deterministically making a nanobeam cavity according to claim 1 further comprising the step of:

tapering a thickness of said nanobeam cavity to linearly increase mirror strengths of said first, second and third grating sections.

3. A method for deterministically making a nanobeam cavity without fine tuning, resizing and rescaling of the structure of the nanobeam cavity, wherein said nanobeam cavity is based on optical strip waveguides along which dielectric index alternations provide constructive interference and produce optical resonance and wherein said nanobeam cavity has a plurality of grating sections, comprising the step of:

selecting a period for said nanobeam cavity, wherein said selected period opens a band gap;

forming said nanobeam cavity to have a width selected to push a fundamental mode of said nanobeam cavity away from a light line;

selecting a periodicity for said nanobeam cavity that will yield a dielectric band edge;

etching a first hole in a first grating section of said nanobeam cavity using a first filling fraction;

etching a second hole in a second grating section of said nanobeam cavity using a second filling fraction, said second filling fraction being different than said first filling fraction;

etching a third hole in a third grating section of said nanobeam cavity using a third filling fraction, said third filling fraction being different than said first and said second filling fractions; and tapering a width of said nanobeam cavity to linearly increase mirror strengths of said first, second and third grating sections;

wherein differences in sizes of said first, second and third holes create linearly increasing mirror strengths for said first, second and third grating sections.

4. An optical device comprising:

a strip waveguide having a width selected to push a fundamental mode of said strip waveguide away from a light line, wherein said strip waveguide comprises:

a central cavity of length L, wherein said length L is from zero to $\lambda/n$, where $\lambda$ is the operating wavelength and n is the refractive index of the material; and a plurality of gratings, wherein a distance between each grating is constant, said distance being selected to open a band gap;

wherein each grating section has a filling fraction and on one side of said central cavity at least two grating sections have different selected filling fractions; and wherein a filling fraction of a hole adjacent said central cavity is selected to yield a dielectric band edge.

5. An optical device according to claim 4 wherein said length L is zero.

6. An optical device according to claim 4 wherein said length L is greater than zero.

7. An optical device according to claim 4, wherein said strip waveguide comprises one selected from the group of: a ridge waveguide, a groove waveguide, a curved waveguide, a tapered waveguide, an optical fiber, and a slot waveguide.

8. An optical device according to claim 4, further comprising pins extending from a central region along a length of said strip waveguide.

9. An optical device according to claim 4, wherein said strip waveguide is formed from one of the following: silicon, silicon on insulator, silicon on sapphire, silica, silicon nitrate, diamond, doped glass, high-index glass, quartz, polymer, polydimethylsiloxane, InP, InGaAsP, GaP, AlGaAs and other III-V compounds, SiGe, SiC, different glasses, and ceramics.

10. An optical device according to claim 4, wherein said device is used as a sensing device to detect a refractive index change of a surrounding material.

11. An optical device according to claim 10, wherein said active materials comprise one of the following: quantum dots, defect color centers and dyes.

12. An optical device according to claim 4, further comprising a plurality of strip waveguides formatted in an array.

13. An optical device according to claim 12, wherein a resonance frequency of each strip waveguide can be reconfigured mechanically.

14. An optical device according to claim 12, wherein a resonance frequency of each cavity can be reconfigured by heating.

15. An optical device according to claim 12, wherein a resonance frequency of each cavity can be reconfigured by carrier injection.

16. An optical device according to claim 12, wherein a resonance frequency of each cavity can be reconfigured by nonlinear optical processes.

17. An optical device according to claim 4, further comprising a plurality of strip waveguides in array or in matrix.

18. An optical device according to claim 4, wherein a resonance frequency of said optical device is in one of the following: the visible range, the near-infra-red range, the mid-infrared range, the UV range, the GHz range and the THz range.

19. An optical device according to claim 4, further comprising means for exciting said strip waveguide, wherein said means comprises one of the following: an optical fiber, a tapered optical fiber, a focused optical beam and an unfocused optical beam.

20. An optical device according to claim 4, further comprising means for collecting a signal from said strip waveguide, wherein said means for collecting comprises one of the following: an optical fiber, a tapered optical fiber, and a lens.

* * * * *